US009606367B2

(12) United States Patent
Yoshino et al.

(10) Patent No.: US 9,606,367 B2
(45) Date of Patent: Mar. 28, 2017

(54) STEREOSCOPIC DISPLAY DEVICE

(71) Applicant: Sharp Kabushiki Kaisha, Osaka (JP)

(72) Inventors: Takuto Yoshino, Osaka (JP); Takehiro Murao, Osaka (JP); Hiroshi Fukushima, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 55 days.

(21) Appl. No.: 14/435,050

(22) PCT Filed: Oct. 10, 2013

(86) PCT No.: PCT/JP2013/077597
§ 371 (c)(1),
(2) Date: Apr. 10, 2015

(87) PCT Pub. No.: WO2014/061548
PCT Pub. Date: Apr. 24, 2014

(65) Prior Publication Data
US 2015/0277130 A1    Oct. 1, 2015

(30) Foreign Application Priority Data

Oct. 16, 2012 (JP) .................. 2012-229094

(51) Int. Cl.
*G09G 3/36* (2006.01)
*G02B 27/22* (2006.01)
*H04N 13/04* (2006.01)

(52) U.S. Cl.
CPC ..... *G02B 27/2214* (2013.01); *H04N 13/0409* (2013.01); *H04N 13/0422* (2013.01); *H04N 13/0452* (2013.01)

(58) Field of Classification Search
CPC ...... G09G 3/36; G09G 3/3611; G09G 3/3614; G09G 3/3625; G09G 3/3648; G09G 2320/0209

(Continued)

(56) References Cited

U.S. PATENT DOCUMENTS

2008/0218669 A1   9/2008  Nishimura et al.
2010/0182686 A1*  7/2010  Fukushima ........ G02B 27/2214
                                                        359/463

(Continued)

FOREIGN PATENT DOCUMENTS

JP    2005-208567 A    8/2005
JP    2006-106607 A    4/2006

(Continued)

*Primary Examiner* — Alexander Eisen
*Assistant Examiner* — Nelson Lam
(74) *Attorney, Agent, or Firm* — Chen Yoshimura LLP

(57) ABSTRACT

Disclosed is a stereoscopic display device that can reduce moiré that occurs due to light-shielding areas in the aperture of pixels. The stereoscopic display device includes a display panel and a parallax barrier. The display panel has a plurality of pixels and displays a stereoscopic image. In the parallax barrier, the direction in which transmissive and non-transmissive parts are alternately arranged is the first direction and the lengthwise direction of the non-transmissive parts is the second direction. There is a boundary that extends in the second direction between two pixels next to each other in the first direction. There are light-shielding areas in the aperture of each pixel. There is a space between the boundary and the light-shielding areas. Of two pixels next to each other in the second direction, the light-shielding areas in the aperture of one pixel are shifted in the first direction with respect to the light-shielding areas in the aperture of the other pixel.

20 Claims, 6 Drawing Sheets

(58) Field of Classification Search
USPC .......................... 345/87–104; 348/42, 51–60
See application file for complete search history.

(56) References Cited

U.S. PATENT DOCUMENTS

| | | | |
|---|---|---|---|
| 2012/0113100 A1 | 5/2012 | Niioka et al. | |
| 2012/0243083 A1* | 9/2012 | Takama | G02B 27/2214 359/462 |
| 2012/0268481 A1* | 10/2012 | Niioka | H04N 13/0415 345/619 |
| 2013/0021561 A1* | 1/2013 | Ahn | G02F 1/133512 349/77 |
| 2013/0235097 A1* | 9/2013 | Eguchi | G02B 27/2214 345/697 |
| 2014/0063378 A1* | 3/2014 | Sumi | H04N 13/0404 349/15 |
| 2014/0168548 A1* | 6/2014 | Murao | H04N 13/0409 349/15 |
| 2014/0347582 A1* | 11/2014 | Murao | G02F 1/1347 349/15 |
| 2014/0362315 A1* | 12/2014 | Murao | G02B 27/26 349/15 |
| 2014/0375914 A1* | 12/2014 | Murao | G02B 27/26 349/15 |

FOREIGN PATENT DOCUMENTS

| | | |
|---|---|---|
| JP | 2008-216722 A | 9/2008 |
| JP | 2012-47769 A | 3/2012 |
| JP | 2012-63556 A | 3/2012 |

* cited by examiner

STEREOSCOPIC DISPLAY DEVICE

TECHNICAL FIELD

The present invention relates to a two-view autostereoscopic display device, and particularly to a two-view autostereoscopic display device that achieves good three-dimensional display quality by reducing moiré.

BACKGROUND ART

Known methods of a two-view autostereoscopic display device, which displays stereoscopic images to a viewer without using special glasses, include a parallax barrier method, which uses slits, and a lenticular lens method, which uses lens effect.

Such an autostereoscopic display device requires the viewer to view the stereoscopic image displayed on the display panel from the ideal viewing location. If the viewer is off from the ideal viewing location, good three-dimensional display quality cannot be achieved because moiré and crosstalk occur due to light-shielding portions between pixels on the display panel (a black matrix, for example).

To address such problems, it has been suggested to use pixels having a specific shape on the display panel (See Japanese Patent Application Laid-Open Publication No. 2012-63556 and Japanese Patent Application Laid-Open Publication No. 2005-208567).

SUMMARY OF THE INVENTION

Using pixels having a specific shape can reduce moiré that occurs due to the light-shielding portions between pixels on the display panel. However, when there are light-shielding areas in the aperture of pixels (when the liquid crystal is driven in VA mode, for example), moiré occurs due to the light-shielding areas even when viewed from the ideal viewing location.

The purpose of the present invention is to provide a stereoscopic display device capable of reducing moiré that occurs due to the light-shielding areas in the aperture of pixels.

A stereoscopic display device of the present invention includes a display panel and a parallax barrier. The display panel has a plurality of pixels and displays a stereoscopic image. The parallax barrier is arranged on one side in the thickness direction of the display panel. In the parallax barrier, transmissive parts and non-transmissive parts are alternately arranged. The direction in which non-transmissive parts and transmissive parts are alternately arranged is the first direction, and the lengthwise direction of the non-transmissive part is the second direction. There is a boundary that extends in the second direction between two pixels next to each other in the first direction. There are light-shielding areas in the aperture of each pixel. There is a space between the light-shielding areas and the boundary. Of two pixels next to each other in the second direction, the light-shielding areas in the aperture of one pixel are shifted in the first direction with respect to the light-shielding areas in the aperture of the other pixel.

The stereoscopic display device of the present invention can reduce moiré that occurs due to the light-shielding areas in the aperture of pixels.

DETAILED DESCRIPTION OF EMBODIMENTS

Figure 1:
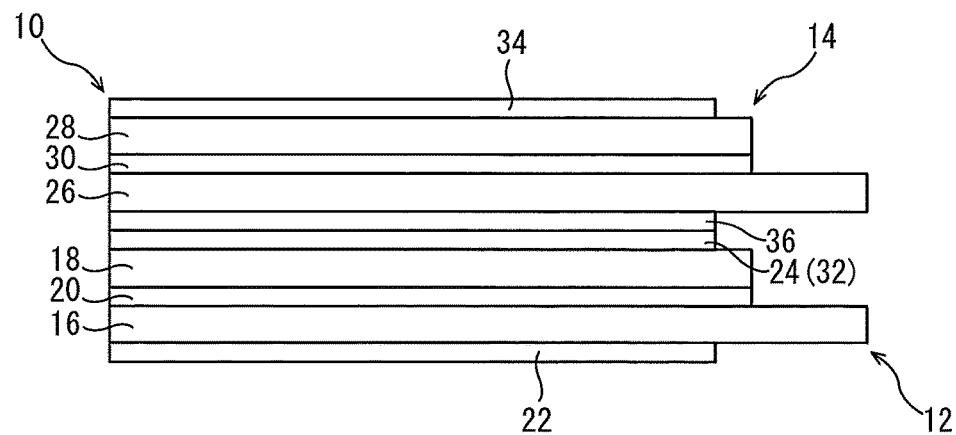
FIG. 1 is a diagram showing an example of a schematic configuration of a stereoscopic display device according to Embodiment 1.

A stereoscopic display device of the present invention includes a display panel that has a plurality of pixels and displays a stereoscopic image; and a parallax barrier arranged on one side in a thickness direction of the display panel, the parallax barrier having transmissive parts and non-transmissive parts alternately arranged in a horizontal direction, wherein each pixel of the display panel has a generally rectangular-shaped aperture through which light transmits, and a light shielding area having an elongated shape extending in a vertical direction, disposed adjacent to a horizontal center of the aperture, and wherein, of two pixels next to each other in the vertical direction, the light-shielding area in the aperture of one pixel is shifted in position in the horizontal direction relative to the light-shielding area in the aperture of the other pixel.

In the above configuration (the first configuration, hereafter), the location where moiré occurs due to the light-shielding areas in the aperture of one pixel, compared to moiré due to the light-shielding areas in the aperture of the other pixel, is off in the first direction (the horizontal direction). Because of this, moiré due to the light-shielding areas can be blurred when viewing the whole display areas of the stereoscopic display device. As a result, moiré can be reduced.

In the second configuration, the first configuration is modified such that a center of width in the horizontal direction of the light-shielding area is shifted in position in the horizontal direction relative to a center of width in the horizontal direction of the pixels. In this case, the decrease in brightness can be reduced when the viewer is at the ideal location for viewing a stereoscopic image (an eye point).

In the third configuration, the first or second configuration is modified such the plurality of pixels include a plurality of pixel groups including red pixels, green pixels, and blue pixels, and such that a center of width in the horizontal direction of the light-shielding area in an aperture of pixels that make up each pixel group is located on a first reference line that extends in the vertical direction.

In the third configuration, a color breakup (a phenomenon in which the display screen displaying white looks like a rainbow at certain viewing angles) can be avoided.

In the fourth configuration, any one of the first to third configurations is modified such that side edges of each non-transmissive part each include an inclined potion that are not in parallel to side edges of the aperture of the corresponding pixel, an inclination of the inclined portion varying periodically along the vertical direction.

In the fourth configuration, edges in the first direction of the boundary and edges in the first direction of the non-transmissive parts are non-parallel. For this reason, the impression of moiré (moiré due to the boundary) that occurs when the viewer is off from the ideal location for viewing stereoscopic images can be reduced.

In the fifth configuration, any one of the first to fourth configurations is modified so as to further include a switching liquid crystal panel arranged on one side in a thickness direction of the display panel, wherein the switching liquid crystal panel includes: a pair of substrates; a liquid crystal layer sealed between the pair of substrates; a common electrode formed on one of the substrates; and a plurality of driving electrodes formed on other the substrate, the driving electrodes realizing the non-transmissive parts in conjunction with the common electrode when a voltage is applied thereto.

In the fifth configuration, if a two-dimensional image is displayed on the display panel while the parallax barrier is disabled, a two-dimensional image can be displayed to the viewer. This feature enables switching between two-dimensional display mode (planar image display) and three-dimensional display mode (stereo image display).

A stereoscopic display device according to another embodiment of the present invention includes a display panel that has a plurality of pixels and displays a stereoscopic image; and a lenticular lens arranged on one side in a thickness direction of the display panel, the lenticular lens including a plurality of cylindrical lenses that are arranged in a row in a horizontal direction, each cylindrical lens extending in a vertical direction, wherein, each pixel of the display panel has a generally rectangular-shaped aperture through which light transmits, and a light shielding area having an elongated shape extending in a vertical direction, disposed adjacent to a horizontal center of the aperture, and wherein, of two pixels next to each other in the vertical direction, the light-shielding area in the aperture of one pixel is shifted in position in the horizontal direction relative to the light-shielding area in the aperture of the other pixel.

In such a configuration, the location where moiré occurs due to the light-shielding areas in the aperture of one pixel, compared to moiré due to the light-shielding areas in the aperture of the other pixel, is off in the first direction. Because of this, moiré due to the light-shielding areas can be blurred when viewing the whole display areas of the stereoscopic display device. As a result, moiré can be reduced.

Below, more specific embodiments of the present invention are described with reference to the drawings. The same or corresponding components in the drawings are denoted by the same reference characters, and a description thereof will not be repeated. For ease of description, drawings referred to below show simplified or schematic configurations, and some of the components are omitted. Components shown in the drawings are not necessarily to scale.

<Embodiment 1>

FIG. 1 shows a stereoscopic display device 10 according to Embodiment 1 of the present invention. The stereoscopic display device 10 includes a display panel 12 and a switching liquid crystal panel 14.

The display panel 12 is a liquid crystal panel. The display panel 12 includes an active matrix substrate 16, an opposite substrate 18, a liquid crystal layer 20, a polarizing plate 22, and a polarizing plate 24. The opposite substrate 18 is arranged facing the active matrix substrate 16. The liquid crystal layer 20 is sealed between the active matrix substrate 16 and the opposite substrate 18. The polarizing plate 22 is placed directly on the active matrix substrate 16. The polarizing plate 24 is placed directly on the opposite substrate 18. The operation mode of the liquid crystal in the display panel 12 is VA mode. A description regarding a plurality of pixels on the display panel 12 will be provided later.

The switching liquid crystal panel 14 is placed on one side in the thickness direction of the display panel 12. The switching liquid crystal panel 14 includes a pair of substrates 26 and 28, a liquid crystal layer 30, a polarizing plate 32, and a polarizing plate 34. The liquid crystal layer 30 is sealed between the pair of substrate 26 and 28. The polarizing plate 32 is placed directly on the substrate 26. In this embodiment, the polarizing plate 24 enables the polarizing plate 32. The polarizing plate 32 is bonded to the substrate 26 by an adhesion layer 36. The polarizing plate 34 is placed directly on the substrate 28.

Figure 2:
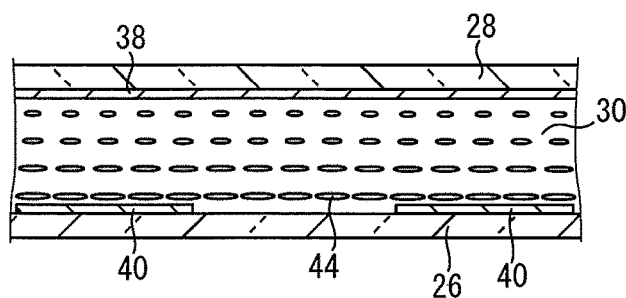
FIG. 2 is a cross-sectional view showing an example of a schematic configuration of a switching liquid crystal panel.

The switching liquid crystal panel 14 is described in detail with reference to FIG. 2. Each of the substrates 26 and 28 is a transparent substrate such as a low alkali glass substrate. A common electrode 38 is formed on the substrate 26. A plurality of driving electrodes 40 are formed on the substrate 28. Each of the electrodes 38 and 40 is a transparent conductive film such as an indium tin oxide film (ITO film). The common electrode 38 is formed on nearly the entire surface of the substrate 28. The plurality of driving electrodes 40 are arranged in the first direction (the left-and-right direction in FIG. 2). The driving electrodes 40 extend in the second direction (the direction that is perpendicular to the surface of the page on which FIG. 2 is drawn) with an approximately uniform width. Though not shown, each of the electrodes 38 and 40 are covered with an alignment film.

Figure 3:
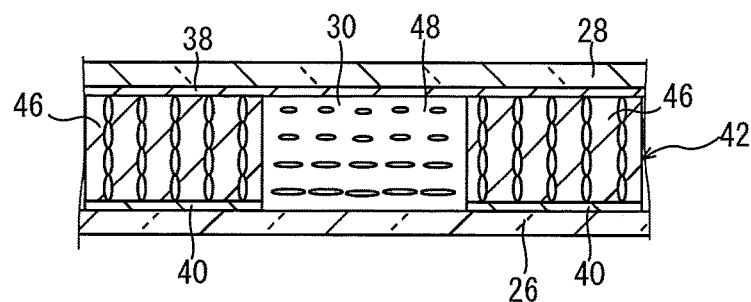
FIG. 3 is a cross-sectional view showing an example of a schematic configuration of a switching liquid crystal panel and is a cross-sectional view showing a state in which a parallax barrier is enabled.

In the stereoscopic display device 10, the switching liquid crystal panel 14 enables the parallax barrier. A parallax barrier 42 is described with reference to FIG. 3.

To enable the parallax barrier 42, a different electric potential is applied to the driving electrodes 40 and the common electrode 38. The difference in electric potential changes the orientation of liquid crystal molecules 44 that are between the driving electrodes 40 and the common electrode 38. For this reason, in the liquid crystal layer 30, portions between the driving electrodes 40 and the common electrode 38 function as non-transmissive parts 46 and a portion between two adjacent non-transmissive parts 46 functions as a transmissive part 48. As a result, in the switching liquid crystal panel 14, the parallax barrier 42, in which the non-transmissive parts 46 and the transmissive parts 48 are arranged alternately, is enabled.

Now, a plurality of pixels 50 in the display panel 12 is described with reference to FIG. 4. The plurality of pixels 50 are arranged in a matrix.

There is a boundary 52 between two pixels 50 next to each other in the first direction. The boundary 52 is a black matrix, for example. The boundary 52 extends in the second direction with an approximately uniform width. Edges 521 and 522 of the boundary 52 are straight lines that extend in the second direction.

There is a boundary 54 between two pixels 50 next to each other in the second direction. The boundary 54 is a black matrix, for example. The boundary 54 and the boundary 52 are connected.

In the display panel 12, columns of pixels 50 that display an image viewed by the right eye of the viewer (right-eye image for viewing a stereoscopic image) and columns of pixels 50 that display an image viewed by the left eye of the viewer (left-eye image for viewing a stereoscopic image) are arranged alternately in the first direction. In other words, the image for the right eye and the image for the left eye are divided into respective pixel columns (in stripe patterns). A synthetic image obtained by alternately arranging such pieces of the right-eye image and the left-eye image that are divided in stripe patterns is displayed on the display panel 12. In this instance, if the parallax barrier 42 is enabled on the liquid crystal panel 14, then only the right-eye image reaches the right eye of the viewer and only the left-eye image reaches the left eye of the viewer. As a result, the viewer can view a stereoscopic image without using special glasses. Also, if a planar image is displayed on the display panel 12 when the parallax barrier 42 is not enabled on the switching panel 14, the planar image can be displayed to the viewer.

Here, there are light-shielding areas 56 and 58 in the aperture of pixels 50.

The light-shielding areas 56 are slits that are formed on pixel electrodes on the active matrix substrate 16, for example. The slits are formed to divide the pixels. There is a space between the light-shielding areas 56 and the boundary 52. In short, the light-shielding areas 56 are formed apart from the boundary 52. The light-shielding areas 56 extend in the second direction with an approximately uniform width. In short, the light-shielding areas 56 include edges 561 and 562 that extend parallel to edges 521 and 522 in the first direction of the boundary 52.

Light-shielding areas 58 are holes formed on the common electrode on an opposite substrate 18, for example. The holes function as the center of alignment for liquid crystal molecules. In each of the pixels 50, there are two light-shielding areas 58. The light-shielding areas 56 are located between two light-shielding areas 58 when viewed directly from the front of the display panel 12.

Here, of two pixels 50A and 50B next to each other in the second direction, the light-shielding areas 56A in the aperture of the pixel 50A are shifted in the first direction with respect to the light-shielding areas 56B in the aperture of the pixel 50B. More specifically, the center of the width C1 (C1A) in the first direction of the light-shielding areas 56A is shifted toward one side in the first direction from a reference line L1. The center of the width C1 (C1B) in the first direction of the light-shielding areas 56B is shifted toward the other side in the first direction from the reference line L1. The reference line L1 is a straight line that extends in the second direction passing through the center of width C2 in the first direction of the pixels 50.

Figure 4:
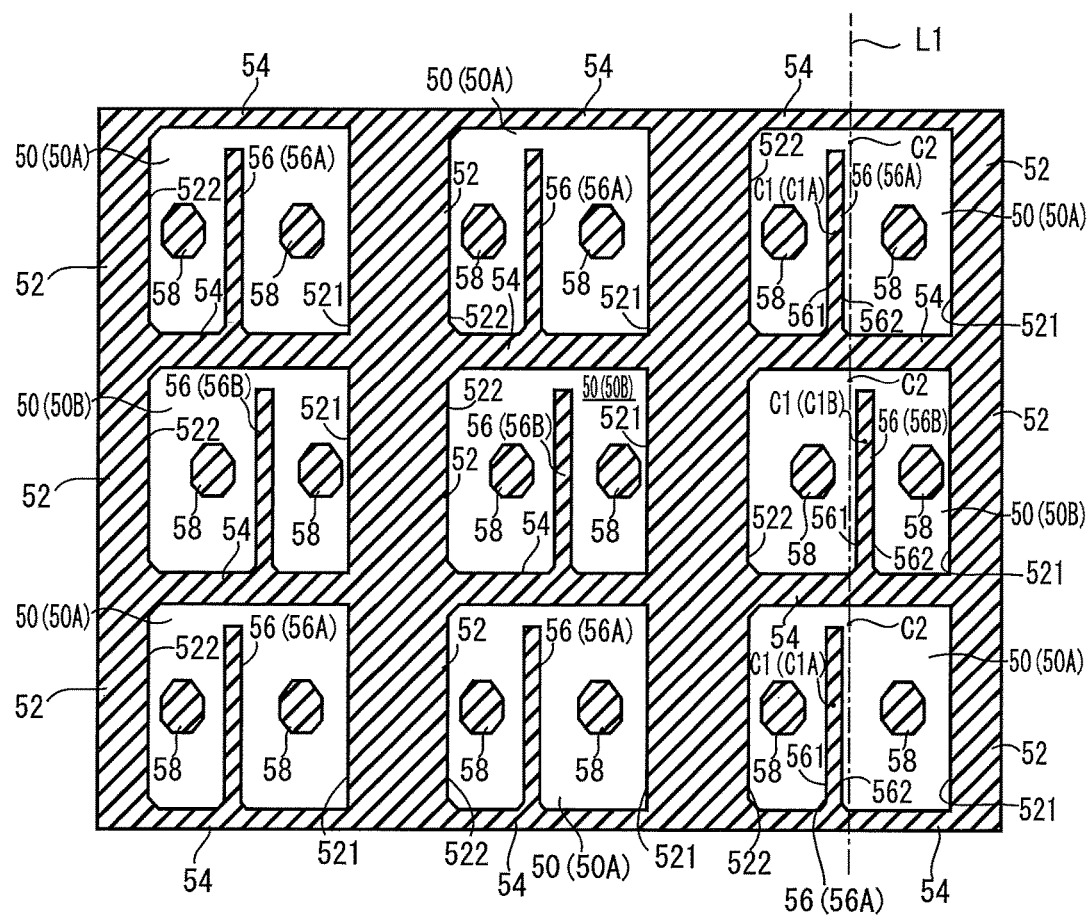
FIG. 4 is a plan view showing a plurality of pixels on the display panel.

Also, in the example shown in FIG. 4, the pixels 50A and the pixels 50B are alternately arranged in the second direction. In short, the light-shielding areas 56A and the light-shielding areas 56B are alternately arranged in the second direction.

In such a stereoscopic display device 10, of two pixels 50A and 50B next to each other in the second direction, the light-shielding areas 56A in the aperture of the pixel 50A are shifted in the first direction with respect to the light-shielding areas 56B in the aperture of the pixel 50B. Thus, the location where moiré occurs due to the light-shielding areas 56A and the location where moiré occurs due to the light-shielding areas 56B are off in the first direction. As a result, moiré can be blurred when viewing the whole display area of the stereoscopic display device 10. For this reason, the stereoscopic display device 10 can reduce moiré.

The center of width C1 in the first direction of the light-shielding areas 56 is shifted in the first direction with respect to the center of width C2 in the first direction of each pixel 50. For this reason, the decrease in brightness at the ideal location for viewing a stereoscopic image (eye point) can be reduced.

<Working Example>

Figure 5:
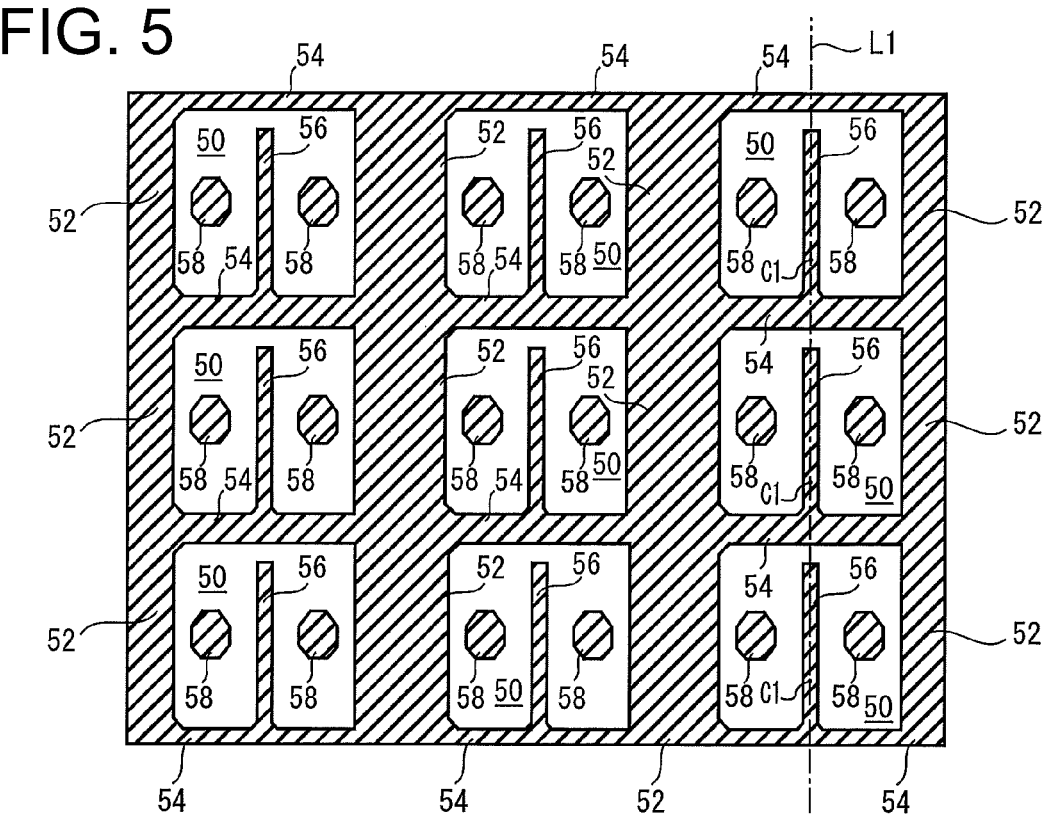
FIG. 5 is a plan view showing a plurality of pixels on the display panel according to a comparison example.

A simulation was conducted to test whether the stereoscopic display device according to the embodiment can reduce moiré (working example). For comparison, another simulation was conducted with a conventional design (see FIG. 5), in which the center of width C1 in the first direction of the light-shielding areas 56 in the aperture of each pixel 50 is located on the reference line L1 (comparison example). The parameters of the simulations were as follows.

The pixel pitch in the first direction was set to 105.75 μm. The pixel pitch in the second direction was set to 70.5 μm. The aperture width in the first direction of the pixels 50 was set to 71.25 μm. The width (the width in the first direction) of the light-transmissive parts 48 in the parallax barrier 42 was set to 1.25 μm. The width in the first direction of the light-shielding areas 56 was set to 6 μm. The thickness of a base substrate of the active matrix substrate 16 was set to 0.3 mm. The thickness of a base substrate of the opposite substrate 18 was set to 0.3 mm. The thickness of the polarizing plate 24 (32) was set to 0.13 mm. The thickness of the adhesion layer 36 was set to 0.05 mm. The thickness of the substrate 26 was set to 0.3 mm. The thickness of the substrate 28 was set to 0.3 mm. The viewing distance was set to 301 mm. The light-shielding areas 56A were formed 5 μm to one side in the first direction from the point on the reference line L1 where the center of width C1A in the first direction is set. The light-shielding areas 56B were formed 5 μm to the other side in the first direction from the location on the reference line L1 where the center of width C1B in the first direction is set. The relationship between angle θ and brightness was measured by simulation while all of the plurality of pixels 50 of the display panel 12 were displaying white and the parallax barrier 42 was enabled on the switching panel 14. Here, angle θ is the angle of inclination measured to left or right from the line of sight seen directly from the front of the display panel 12.

Figure 6:
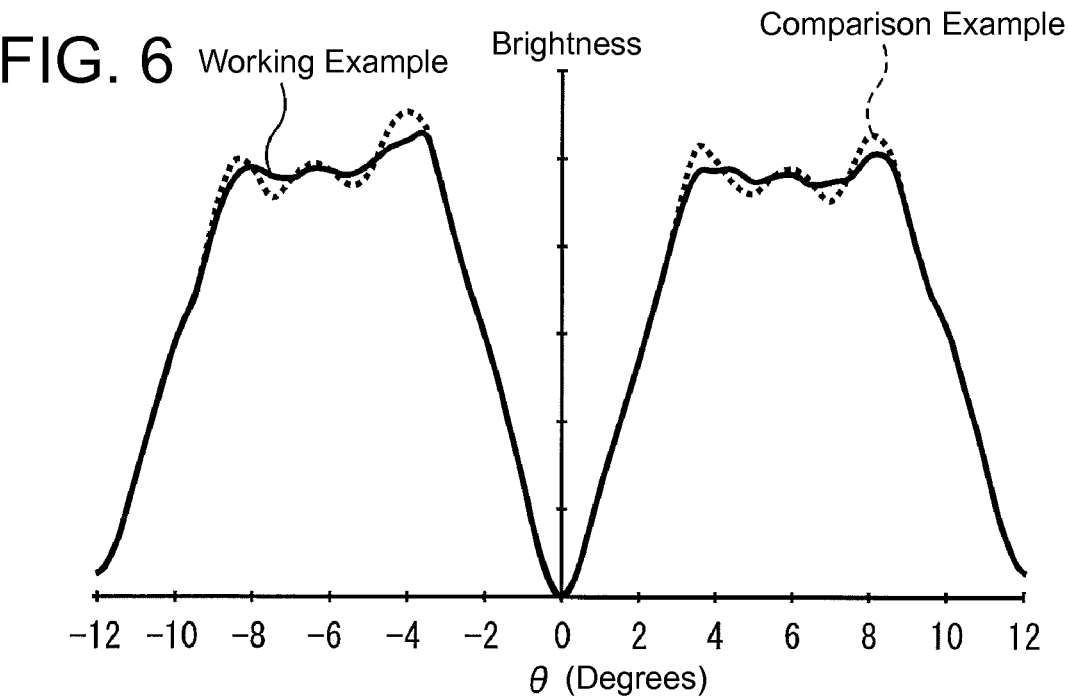
FIG. 6 is a graph showing the result of a simulation and the relationship between angle θ and brightness.

FIG. 6 shows the result of the simulations. As FIG. 6 clearly shows, the stereoscopic display device according to the working example can reduce the difference in brightness around an eye point (θ≈±6 degrees in FIG. 6) compared to the stereoscopic display device according to the comparison example. Based on this result, it was possible to surmise that the stereoscopic display device according to the embodiment of the present invention can reduce moiré.

<Application Example of Pixel Arrangement>

In the example shown in FIG. 4, the pixels 50A and the pixels 50B were alternately arranged in the second direction, but the pixels 50A and the pixels 50B do not need to be alternately arranged in the second direction. Two pixels 50A may be arranged next to each other in the second direction, for example.

Also, in the example shown in FIG. 4, the pixels 50A and the pixels 50B were not alternately arranged in the first direction, but the pixels 50A and the pixels 50B may be alternately arranged in the first direction.

<Application Example of Pixels>

Figure 7:
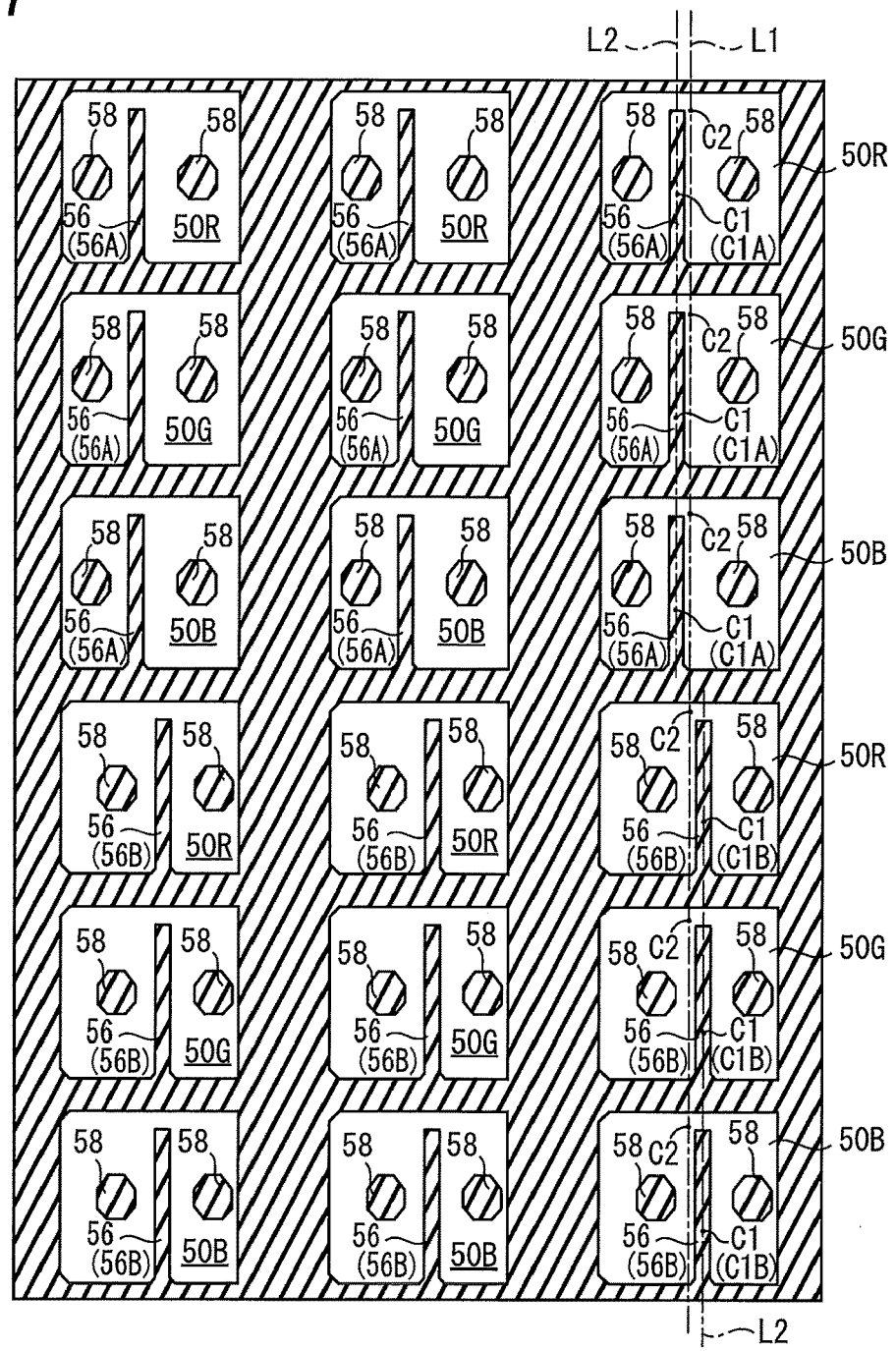
FIG. 7 is a plan view showing an application example of pixels that is applicable to the present invention.

As shown in FIG. 7, each pixel 50 may be a subpixel. In the example shown in FIG. 7, subpixels are red pixels 50R, green pixels 50G, and blue pixels 50B. A red pixel 50R, a green pixel 50G, and a blue pixel 50B form a single pixel group. In short, the display panel 12 includes a plurality of pixel groups.

In this case, it is preferable that each of the light-shielding areas 56 in the aperture of subpixels forming each pixel group be located on the reference line L2 extending in the second direction. In this arrangement, a color breakup (a phenomenon in which the display screen displaying white looks like a rainbow at certain viewing angles) can be avoided.

<Embodiment 2>

Figure 8:
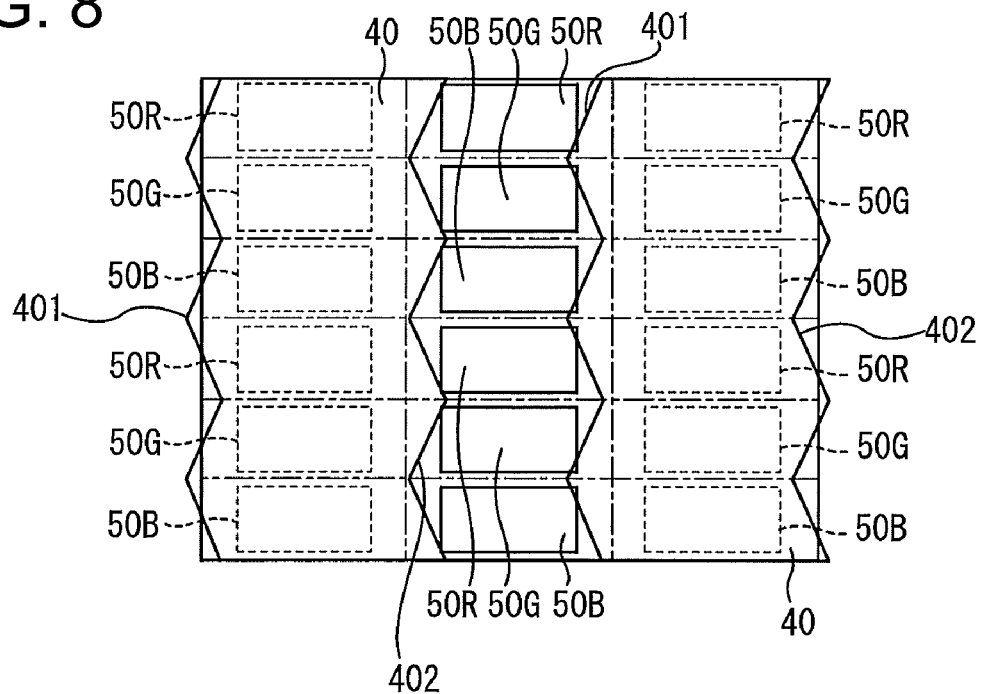
FIG. 8 is a plan view showing the main part of the stereoscopic display device of the present invention according to Embodiment 2 and the relationship between the edges of driving electrodes equipped on the switching liquid crystal panel and the edges of the boundary of the display panel.

As shown in FIG. 8, edges 401 and 402 in a first direction of driving electrodes 40 on a switching liquid crystal panel 14 may include parts that are non-parallel to edges 521 and 522 in the first direction of the boundary 52 of pixels 50 on a display panel 12 and may change in a second direction at certain fixed intervals, for example. In this case, moiré that occurs when a viewer is off from the ideal viewing location can be reduced. The example in FIG. 8 is showing a case in which each of the pixels 50 is a subpixel (including a red pixel 50R, a green pixel 50G, and a blue pixel 50B in the present embodiment).

<Working Example>

A simulation was conducted to test whether the stereoscopic display device according to the Embodiment 2 can reduce moiré. The parameters of the simulation were the same as when the simulation for the stereoscopic display device according to Embodiment 1 was conducted. However, the details of the edges in the first direction of the driving electrodes were as follows.

The edges in the first direction of the driving electrodes were formed such that two angled edges that tilt in mutually opposite directions were arranged alternately in the second direction. The angle between each angled edge and a straight line extending in the second direction was set to 15 degrees. The length in the second direction of each angled edge was the same as that of the pixel pitch in the second direction.

Figure 9:
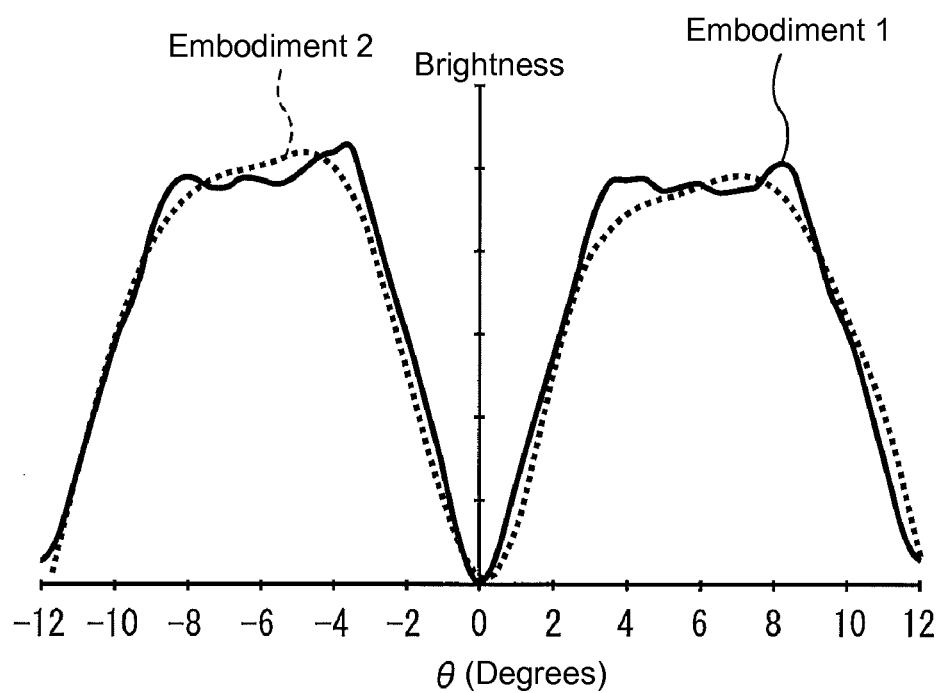
FIG. 9 is a graph showing the result of a simulation and the relationship between angle θ and brightness.

FIG. 9 shows a result of the simulation. For comparison, FIG. 9 also shows the result of the simulation regarding the stereoscopic display device according to Embodiment 1.

As FIG. 9 clearly shows, the stereoscopic display device according to Embodiment 2 can reduce the difference in brightness around an eye point (θ≈±6 degrees in FIG. 9) compared to the stereoscopic display device according to Embodiment 1. Based on this result, it was possible to surmise that the stereoscopic display device according to Embodiment 2 can reduce moiré more than the stereoscopic display device of Embodiment 1.

<Embodiment 3>

Figure 10:
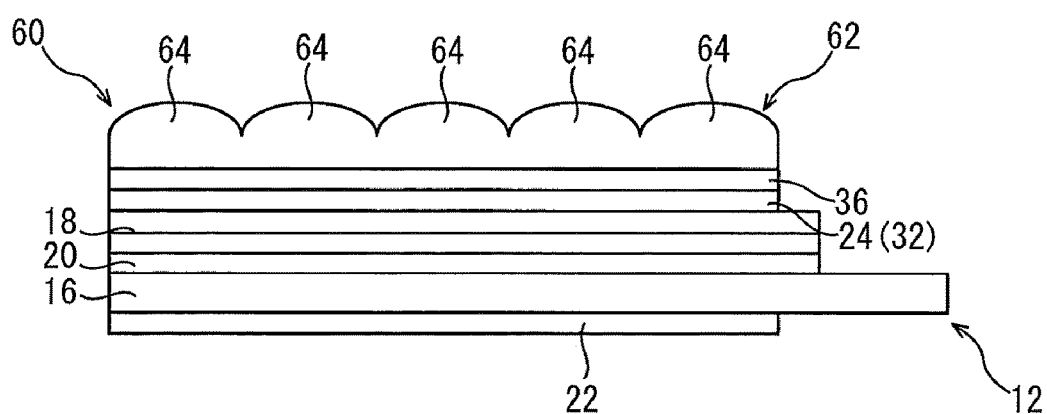
FIG. 10 is a diagram showing an example of a schematic configuration of a stereoscopic display device of the present invention according to Embodiment 3.

As shown in FIG. 10, a stereoscopic display device 60 may include a lenticular lens 62 instead of a switching liquid crystal panel 14. The lenticular lens 62 is arranged on one side (the side of the viewer) in the thickness direction of a display panel 12. The lenticular lens 62 includes a plurality of cylindrical lenses 64. The plurality of cylindrical lenses 64 are arranged in a row in the horizontal direction of the display panel.

Also, in such a stereoscopic display device 60, moiré caused by the light-shielding areas 56 in the aperture of pixels 50 can be blurred.

So far, embodiments of the present invention have been described, but they are merely examples and do not limit the present invention at all.

When the aperture width of a transmissive part 48 (the aperture width in the first direction) is made bigger than the aperture width of the pixels 50 (the aperture width in the first direction), a quasi-lens is formed on the transmissive part 48, for example. In this case, the transmissive part 48 exhibits a focusing effect. As a result, the brightness of three-dimensional display improves.

In Embodiment 1 and Embodiment 2, a switching display panel is not absolutely necessary. A parallax barrier may be equipped on one side in the thickness direction of the display panel, for example.

The stereoscopic display device may be a display device that supports landscape and portrait modes, for example. In this case, the switching panel enables a parallax barrier in the landscape display mode and a parallax barrier in the portrait display mode.

What is claimed is:

1. A stereoscopic display device, comprising:
   a display panel that has a plurality of pixels and displays a stereoscopic image; and
   a parallax barrier arranged on one side in a thickness direction of said display panel, said parallax barrier having transmissive parts and non-transmissive parts alternately arranged in a horizontal direction,
   wherein each pixel of the display panel has a generally rectangular-shaped aperture through which light transmits, and a light shielding area in the aperture that includes a vertically elongated shaped pattern extending in a vertical direction, disposed adjacent to a horizontal center of the aperture, and
   wherein said plurality of pixels includes a first group of pixels and a second group of pixels, said vertically elongated shaped pattern in the aperture of each pixel in the first group is shifted in position in the horizontal direction to one side of a virtual vertical line passing through the horizontal center of the aperture, and said vertically elongated shaped pattern in the aperture of each pixel in the second group is shifted in position in the horizontal direction to the other side of said virtual vertical line.

2. The stereoscopic display device according to claim 1, wherein in each pixel, a center of width in the horizontal direction of said light-shielding area is shifted in position in the horizontal direction relative to a center of width in the horizontal direction of the pixels.

3. The stereoscopic display device according to claim 2, wherein said plurality of pixels include a plurality of pixel groups comprising red pixels, green pixels, and blue pixels, and
   wherein a center of width in said horizontal direction of said light-shielding area in an aperture of pixels that make up each pixel group is located on a first reference line that extends in the vertical direction.

4. The stereoscopic display device according to claim 3, wherein side edges of each non-transmissive part each include an inclined portion that are not in parallel to side edges of the aperture of the corresponding pixel, an inclination of the inclined portion varying periodically along the vertical direction.

5. The stereoscopic display device according to claim 4, further comprising:
   a switching liquid crystal panel arranged on one side in a thickness direction of said display panel, wherein said switching liquid crystal panel comprises:
a pair of substrates;
a liquid crystal layer sealed between said pair of substrates;
a common electrode formed on one of said substrates; and
a plurality of driving electrodes formed on other said substrate, said driving electrodes realizing said non-transmissive parts in conjunction with said common electrode when a voltage is applied thereto.

6. The stereoscopic display device according to claim 3, further comprising:
a switching liquid crystal panel arranged on one side in a thickness direction of said display panel,
wherein said switching liquid crystal panel comprises:
a pair of substrates;
a liquid crystal layer sealed between said pair of substrates;
a common electrode formed on one of said substrates; and
a plurality of driving electrodes formed on other said substrate, said driving electrodes realizing said non-transmissive parts in conjunction with said common electrode when a voltage is applied thereto.

7. The stereoscopic display device according to claim 2, wherein side edges of each non-transmissive part each include an inclined portion that are not in parallel to side edges of the aperture of the corresponding pixel, an inclination of the inclined portion varying periodically along the vertical direction.

8. The stereoscopic display device according to claim 7, further comprising:
a switching liquid crystal panel arranged on one side in a thickness direction of said display panel,
wherein said switching liquid crystal panel comprises:
a pair of substrates;
a liquid crystal layer sealed between said pair of substrates;
a common electrode formed on one of said substrates; and
a plurality of driving electrodes formed on other said substrate, said driving electrodes realizing said non-transmissive parts in conjunction with said common electrode when a voltage is applied thereto.

9. The stereoscopic display device according to claim 2, further comprising:
a switching liquid crystal panel arranged on one side in a thickness direction of said display panel,
wherein said switching liquid crystal panel comprises:
a pair of substrates;
a liquid crystal layer sealed between said pair of substrates;
a common electrode formed on one of said substrates; and
a plurality of driving electrodes formed on other said substrate, said driving electrodes realizing said non-transmissive parts in conjunction with said common electrode when a voltage is applied thereto.

10. The stereoscopic display device according to claim 1, wherein said plurality of pixels include a plurality of pixel groups comprising red pixels, green pixels, and blue pixels, and
wherein a center of width in said horizontal direction of said light-shielding area in an aperture of pixels that make up each pixel group is located on a first reference line that extends in the vertical direction.

11. The stereoscopic display device according to claim 10, wherein side edges of each non-transmissive part each include an inclined portion that are not in parallel to side edges of the aperture of the corresponding pixel, an inclination of the inclined portion varying periodically along the vertical direction.

12. The stereoscopic display device according to claim 11, further comprising:
a switching liquid crystal panel arranged on one side in a thickness direction of said display panel,
wherein said switching liquid crystal panel comprises:
a pair of substrates;
a liquid crystal layer sealed between said pair of substrates;
a common electrode formed on one of said substrates; and
a plurality of driving electrodes formed on other said substrate, said driving electrodes realizing said non-transmissive parts in conjunction with said common electrode when a voltage is applied thereto.

13. The stereoscopic display device according to claim 10, further comprising:
a switching liquid crystal panel arranged on one side in a thickness direction of said display panel,
wherein said switching liquid crystal panel comprises:
a pair of substrates;
a liquid crystal layer sealed between said pair of substrates;
a common electrode formed on one of said substrates; and
a plurality of driving electrodes formed on other said substrate, said driving electrodes realizing said non-transmissive parts in conjunction with said common electrode when a voltage is applied thereto.

14. The stereoscopic display device according to claim 1, wherein side edges of each non-transmissive part each include an inclined portion that are not in parallel to side edges of the aperture of the corresponding pixel, an inclination of the inclined portion varying periodically along the vertical direction.

15. The stereoscopic display device according to claim 14, further comprising:
a switching liquid crystal panel arranged on one side in a thickness direction of said display panel,
wherein said switching liquid crystal panel comprises:
a pair of substrates;
a liquid crystal layer sealed between said pair of substrates;
a common electrode formed on one of said substrates; and
a plurality of driving electrodes formed on other said substrate, said driving electrodes realizing said non-transmissive parts in conjunction with said common electrode when a voltage is applied thereto.

16. The stereoscopic display device according to claim 1, further comprising:
a switching liquid crystal panel arranged on one side in a thickness direction of said display panel,
wherein said switching liquid crystal panel comprises:
a pair of substrates;
a liquid crystal layer sealed between said pair of substrates;
a common electrode formed on one of said substrates; and
a plurality of driving electrodes formed on other said substrate, said driving electrodes realizing said non-transmissive parts in conjunction with said common electrode when a voltage is applied thereto.

17. The stereoscopic display device according to claim 1, wherein pixels in the first group and pixels in the second group are alternately disposed in the vertical direction.

18. The stereoscopic display device according to claim 1, wherein the light-shielding area in each pixel further includes a pair of generally round-shaped patterns in the aperture that sandwich the vertically elongated shaped pattern in the horizontal direction.

19. A stereoscopic display device, comprising:
- a display panel that has a plurality of pixels and displays a stereoscopic image; and
- a lenticular lens arranged on one side in a thickness direction of said display panel, said lenticular lens including a plurality of cylindrical lenses that are arranged in a row in a horizontal direction, each cylindrical lens extending in a vertical direction,
- wherein, each pixel of the display panel has a generally rectangular-shaped aperture through which light transmits, and a light shielding area that includes a vertically elongated shaped pattern extending in a vertical direction, disposed adjacent to a horizontal center of the aperture, and
- wherein said plurality of pixels includes a first group of pixels and a second group of pixels, said vertically elongated shaped pattern in the aperture of each pixel in the first group is shifted in position in the horizontal direction to one side of a virtual vertical line passing through the horizontal center of the aperture, and said vertically elongated shaped pattern in the aperture of each pixel in the second group is shifted in position in the horizontal direction to the other side of said virtual vertical line.

20. The stereoscopic display device according to claim 19, wherein pixels in the first group and pixels in the second group are alternately disposed in the vertical direction.

* * * * *